(12) United States Patent
Wu

(10) Patent No.: US 11,226,850 B2
(45) Date of Patent: Jan. 18, 2022

(54) SCENARIO BASED MULTIPLE APPLICATIONS ON-SCREEN

(71) Applicant: Citrix Systems, Inc., Fort Lauderdale, FL (US)

(72) Inventor: Hao Wu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/252,194

(22) Filed: Jan. 18, 2019

(65) Prior Publication Data
US 2020/0201687 A1    Jun. 25, 2020

Related U.S. Application Data

(63) Continuation of application No. PCT/CN2018/122011, filed on Dec. 19, 2018.

(51) Int. Cl.
*G06F 9/54* (2006.01)
(52) U.S. Cl.
CPC .................... *G06F 9/542* (2013.01)
(58) Field of Classification Search
None
See application file for complete search history.

(56) References Cited

U.S. PATENT DOCUMENTS

| | | | |
|---|---|---|---|
| 2014/0223112 A1* | 8/2014 | Serjeanston | H04L 67/1095 711/147 |
| 2014/0304715 A1* | 10/2014 | Park | G06F 9/542 719/318 |
| 2015/0074687 A1* | 3/2015 | Ji | G06F 9/445 719/318 |
| 2017/0257360 A1* | 9/2017 | Gattu | H04L 63/10 |
| 2018/0068345 A1 | 3/2018 | Hirokawa et al. | |

FOREIGN PATENT DOCUMENTS

| | | |
|---|---|---|
| CN | 106201167 A | 12/2016 |
| CN | 106528081 A | 3/2017 |
| CN | 107357515 A | 11/2017 |

OTHER PUBLICATIONS

Sep. 19, 2019—(PCT) International Search Report and Written Opinion—App. PCT/CN2018/12201.

* cited by examiner

*Primary Examiner* — Chat C Do
*Assistant Examiner* — William C Wood
(74) *Attorney, Agent, or Firm* — Banner & Witcoff, Ltd.

(57) ABSTRACT

Aspects of the disclosure relate to scenario based multiple application display on-screen. An enterprise application management server may determine one or more of secondary applications associated with a primary application. The enterprise application management server may receive information associated with a triggering event that occurred in the primary application. The enterprise application management server may determine a particular secondary application from the one or more secondary applications based on the received information associated with the triggering event. Accordingly, enterprise application management server may cause to display the particular secondary application simultaneously with the primary application on the screen of the mobile device.

17 Claims, 13 Drawing Sheets

Secondary App "VIP access" will be launched
When main trigger (VIP tokencode input) has
been hit on Main App "Citrix VPN"

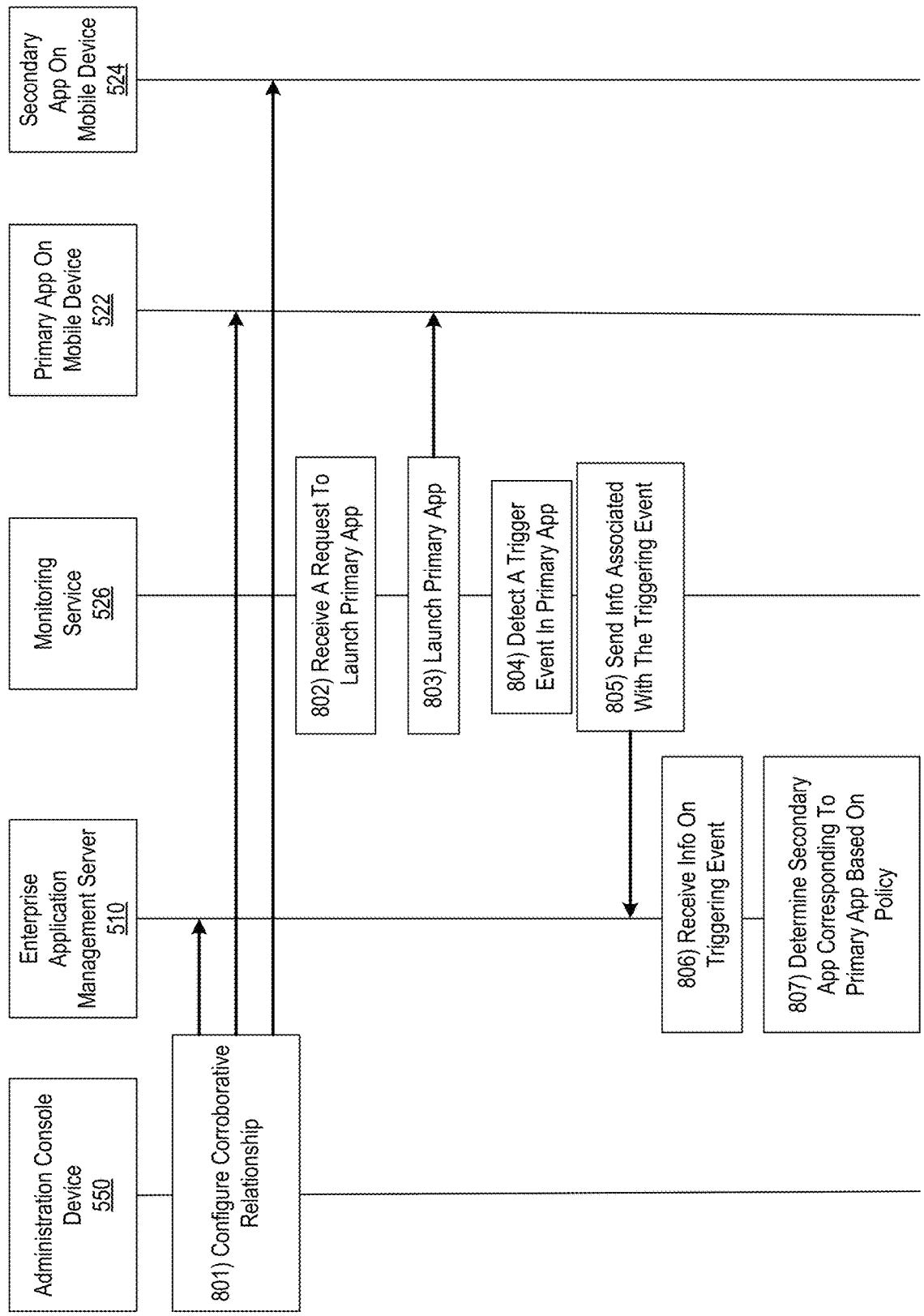

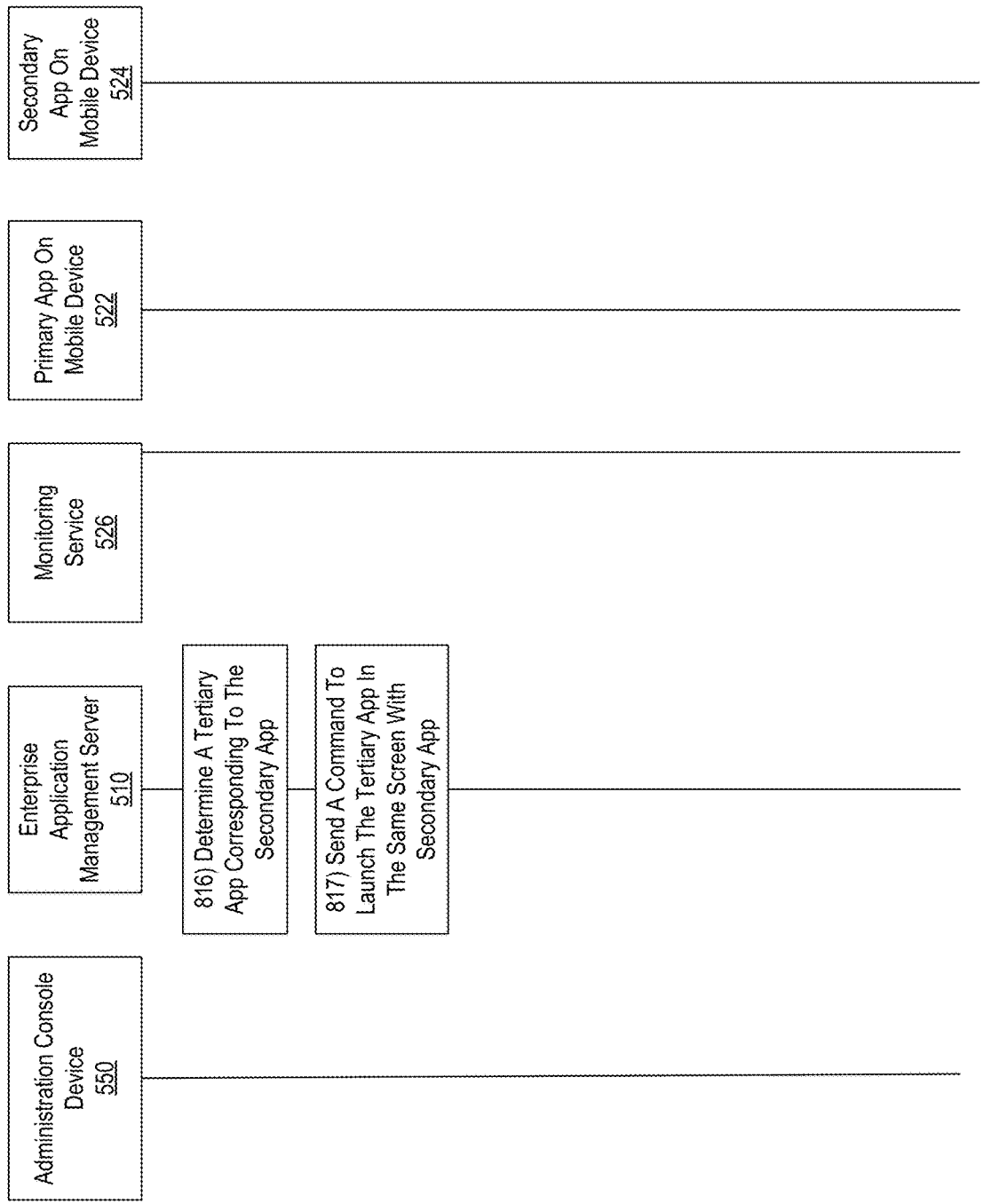

SCENARIO BASED MULTIPLE APPLICATIONS ON-SCREEN

CROSS-REFERENCE TO RELATED APPLICATIONS

This application is a continuation of Application No. PCT/CN2018/122011, filed on Dec. 19, 2018. The entire contents of this application is incorporated herein by reference in its entirety.

FIELD

Aspects of the disclosure relate to computer hardware and software. In particular, one or more aspects of the disclosure generally relate to computer hardware and software for application management and presentation in a mobile computing environment.

BACKGROUND

In a cloud-based environment, enterprise users may need to frequently switch across multiple applications on a mobile device. For example, when a user logs in to a VPN application which may need two factor authentication (i.e., input login credential to the VPN application then input a secure token from a VIP token application), the user may need to first launch the VPN application on the mobile device, then switch to the VIP token application to copy the secure code and paste back to the VPN application. It may be tedious for the user to navigate across the primary application (e.g., the VPN application) and the secondary application (e.g., the VIP token application), and the frequent switching among applications may generate excess overhead and negatively impact productivity. As a result, conventional systems are not be able to coordinate the display of the primary application and the secondary application with efficiency, performance and an optimal user experience.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a scenario based multiple applications displayed on-screen.

In accordance with one or more aspects of the disclosure, an enterprise application management server having at least one processor, memory, and a communication interface may determine one or more secondary applications associated with a primary application. Thereafter, the enterprise application management server may receive, via the communication interface, a triggering event that occurred in the primary application and may determine a particular secondary application from the one or more secondary applications based on the received triggering event. Accordingly, the enterprise application management server may cause to display the particular secondary application simultaneously with the primary application on a same screen of the mobile device.

In some instances, prior to determining one or more secondary applications associated with a primary application, the enterprise application management server may provision the mobile device to be managed by the enterprise application management server to access one or more enterprise resources.

In some instances, prior to determining one or more secondary applications associated with a primary application, the enterprise application management server may modify the primary application to enable multiple application support for the primary application on the screen of the mobile device.

In some instances, the enterprise application management server may receive, via the communication interface, a sub-triggering event that occurred in the particular secondary application, determine a tertiary application corresponding to the particular secondary application based on the received sub-triggering event; and cause to display the tertiary application simultaneously with the secondary application on the screen of the mobile device.

In some instances, the enterprise application management server may receive, via the communication interface, a sub-triggering event occurred in the secondary application and cause to maximize; or minimize the secondary application in the screen of the mobile device, where the secondary application may be executed in a background of the mobile device.

In some instances, the enterprise application management server may determine the one or more secondary applications associated with the primary application based on a policy indicating whether the primary application and the one or more secondary applications are allowed to be displayed simultaneously on the screen.

In some instances, the enterprise application management server may automatically capture a collaboration relationship between the primary application and the one or more secondary applications.

In some instances, in response to causing to display the particular secondary application simultaneously with the primary application, the enterprise application management server may receive, via the communication interface, user input data from the particular secondary application; and send, via the communication interface, the user input data to the primary application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 8A-8C depict an example event sequence for scenario based display of multiple applications on-screen, in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards scenario based display of multiple applications on-screen. An enterprise application management server may automatically capture the collaborative relationship between a primary application and one or more secondary applications. Based on a triggering event occurred in the primary application, the enterprise application management server may automatically invoke a secondary application and coordinate the display of the primary application and a secondary application on a same screen of the mobile device. The enterprise application management server may further allow data exchange between these applications while they are displayed concurrently on the screen. As such, the enterprise application management server may reduce the tedious operations for the user to navigate among multiple applications and enhance coordination among applications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
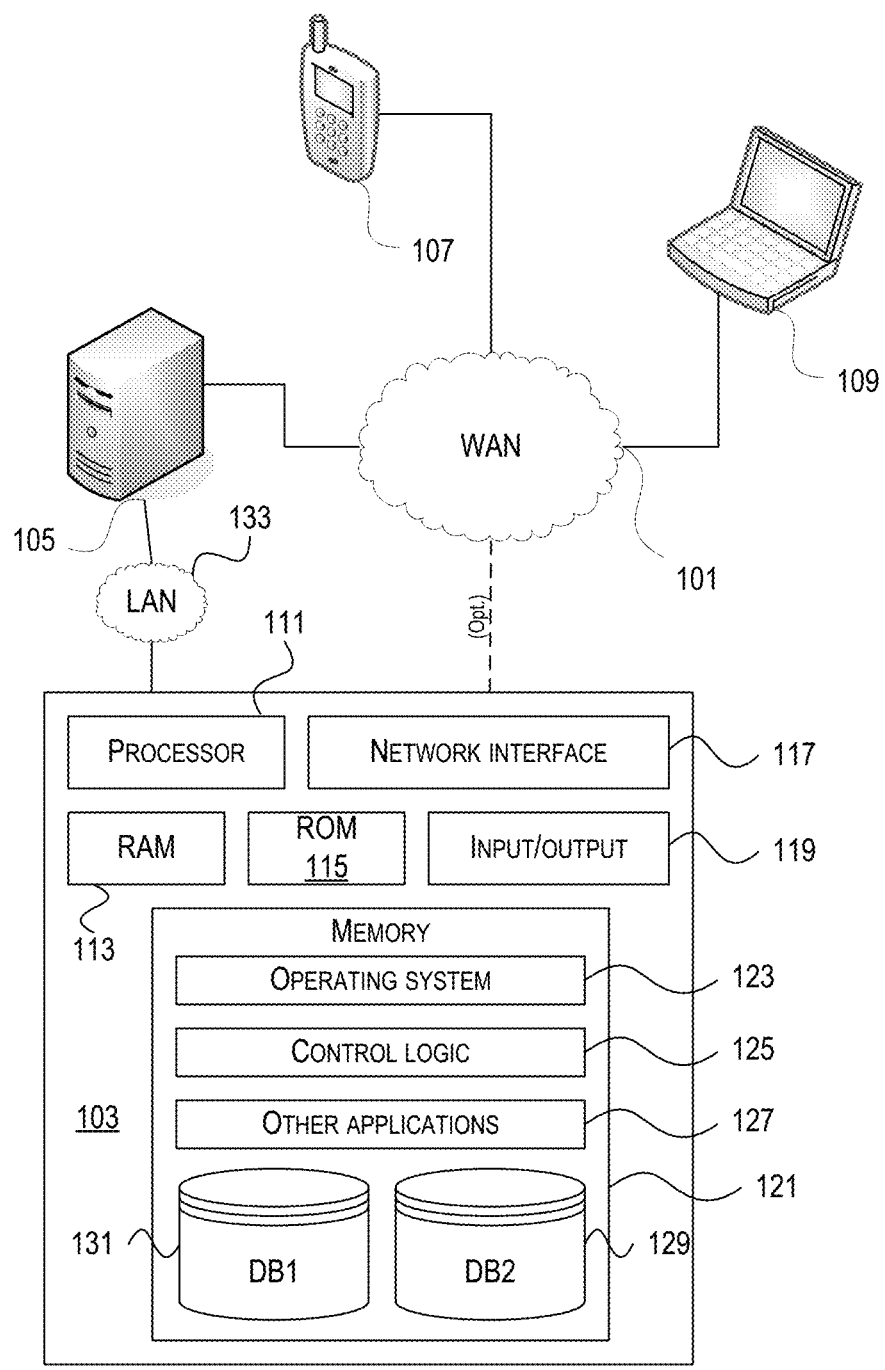
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
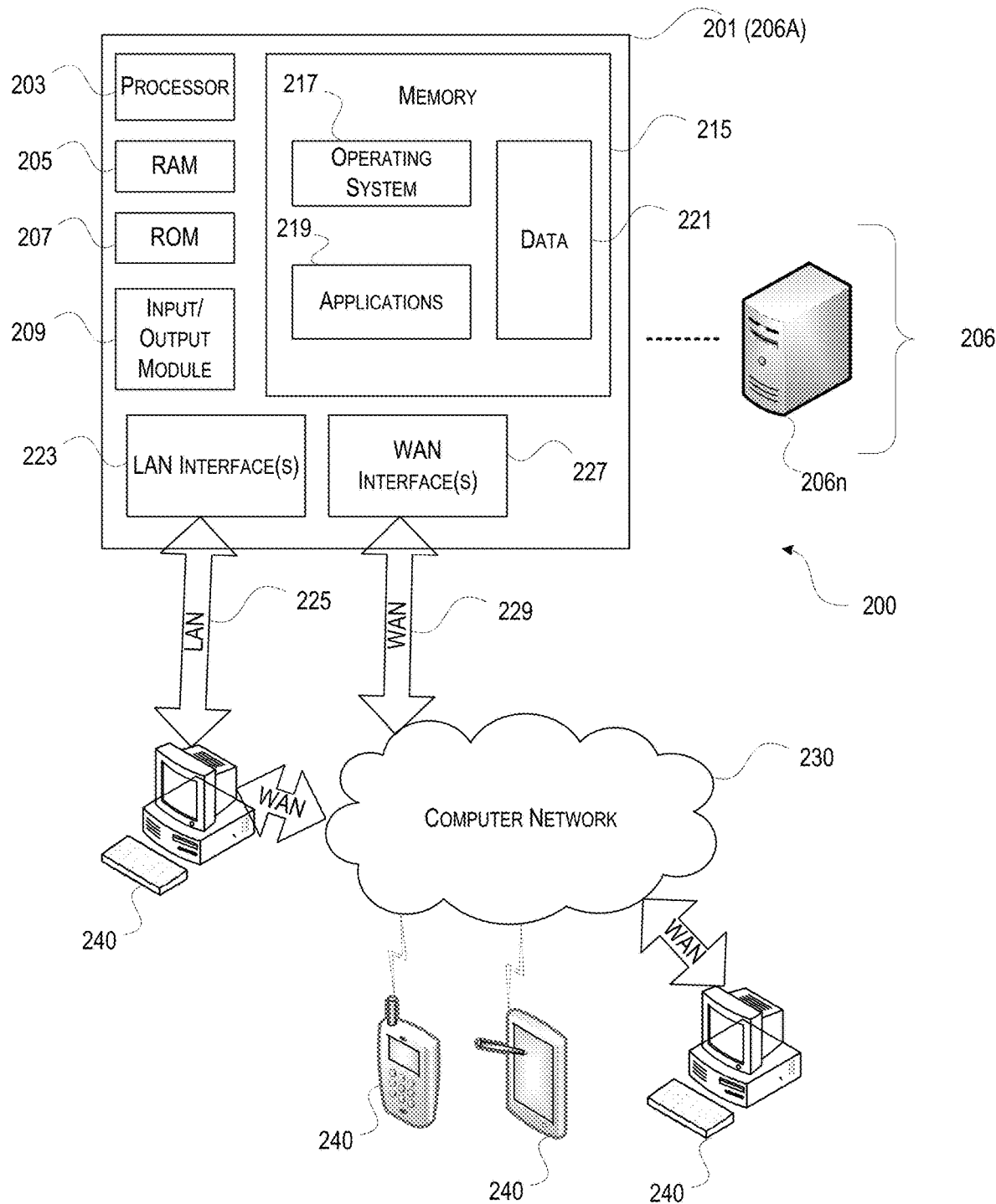
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
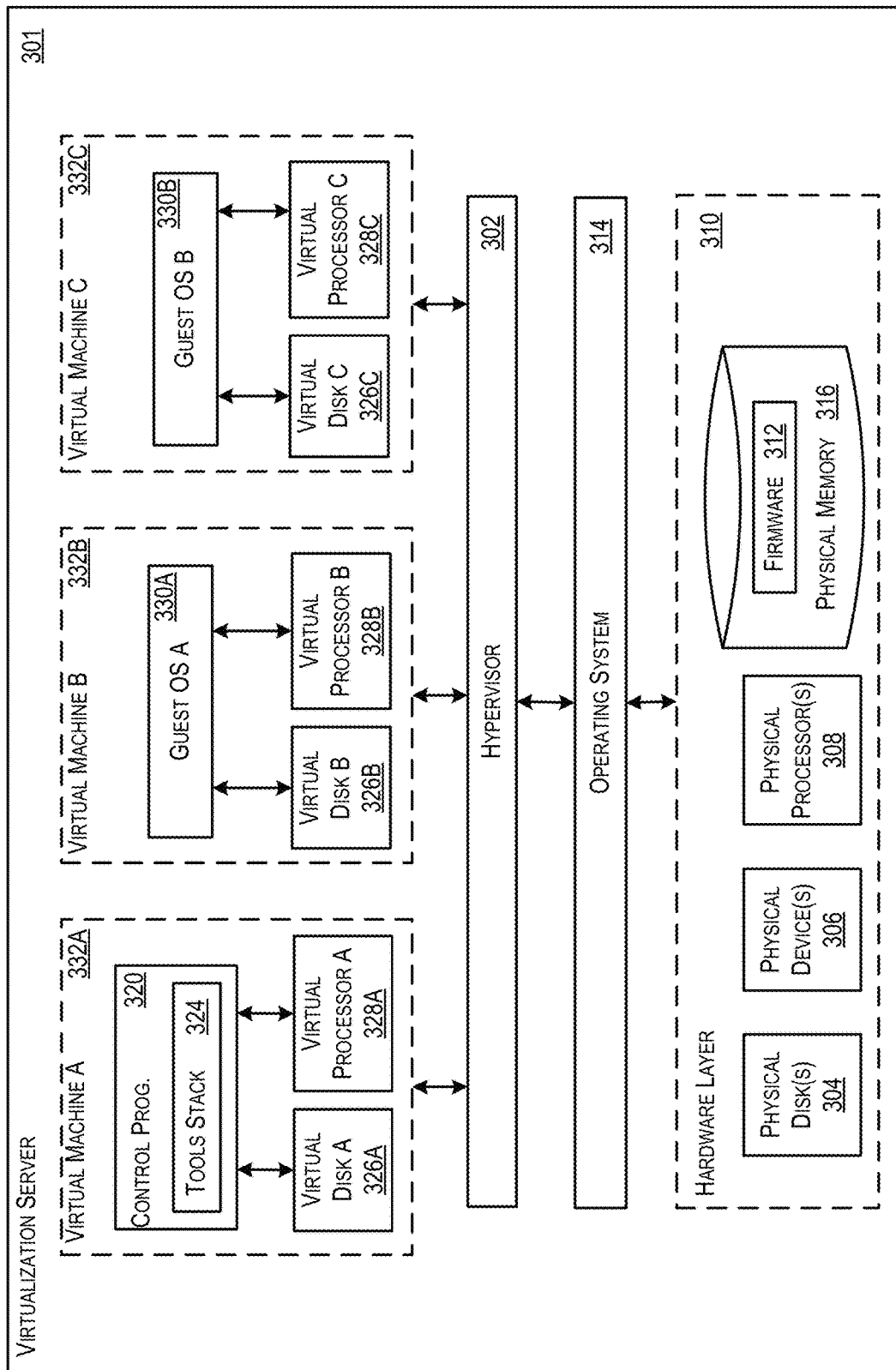
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
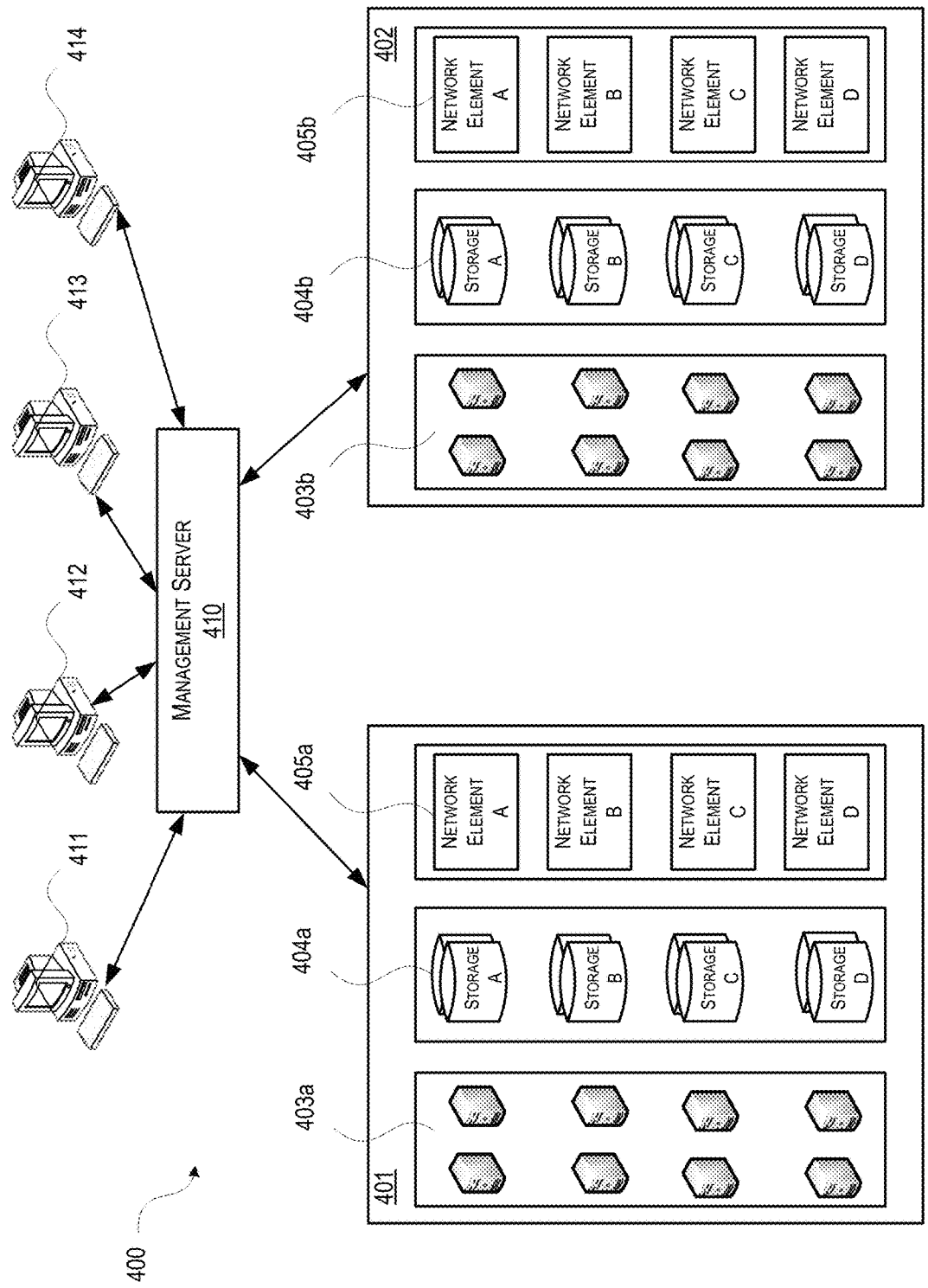
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Scenario Based Multiple Application Display On-Screen

As discussed above, aspects of the disclosure relate to scenario based multiple application display on-screen. For example, a primary and a secondary application may have a collaborative relationship and they may be displayed on a screen of the mobile device simultaneously in response to a triggering event. In addition, one or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-4.

Figure 5:
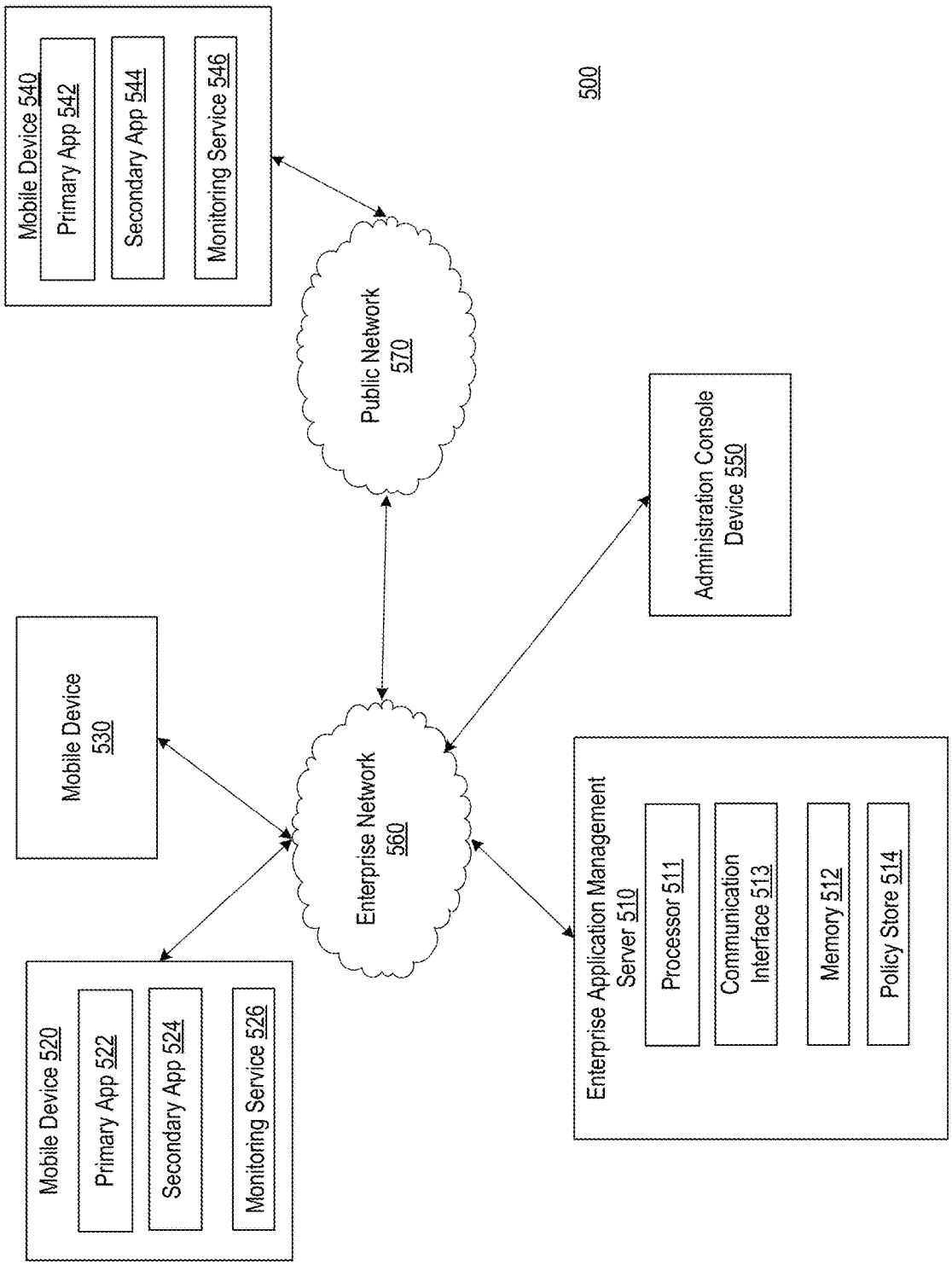
FIG. 5 depicts an illustrative computing environment for scenario based multiple applications display on-screen in accordance with one or more illustrative aspects described herein.

FIG. 5 depicts an illustrative computing environment for scenario based multiple application display on-screen in accordance with one or more illustrative aspects described herein. Referring to FIG. 5, computing environment 500 may include an enterprise application management server 510, client devices 520-540, an administration console device 550, an enterprise network 560 and a public network 570. Enterprise application management server 510, client devices 520-540, and administration console device 550 may include one or more physical components, such as one or more processors, memories, communication interfaces, and/or the like.

Enterprise application management server 510 may include processor 511, memory 512, communication interface 513 and a policy store 514. Processor 511 may execute instructions stored in memory 512 to cause enterprise application management server 510 to perform one or more functions, such as automatically capture the collaborative relationship between a primary application and secondary applications. Communication interface 513 may include one or more network interfaces via which enterprise application management server 510 can communicate with one or more other systems and/or devices in computing environment 500, such as, client devices 520-540, and administration console device 550. Memory 512 may store collaborative information between the primary and secondary applications or policy store 514 may store policy information stipulate such collaborative information between the primary and secondary applications.

Enterpriser application management server 510 may be responsible for managing application execution, display and interaction and may send and receive information to client devices 520-540, administrator console device 550, and other computing devices of computing environment 500. For example, enterprise application management server 510 may be a server similar to management server 410. Administrator console device 550 may have an administrator's console where enterprise administrators may send requests to enterprise application management server 510 to configure the collaborative relationship between the primary and secondary applications based on policies via the administrator's console. Client devices 520-540 may be any type of computing device including, for example, a server, computer, laptop, tablet, smartphone, or other client device that includes a processor (e.g., computing device 201). User devices 520-540 may communicate, via their communication interfaces (e.g., wireless interfaces, LAN interfaces, WLAN interfaces), with other devices and/or entities such as enterpriser application management server 510, as discussed in greater detail below. User devices 520-540 may also communicate with various network nodes described herein.

Enterprise network 560 may include one or more wide area networks and/or local area networks and may interconnect one or more systems and/or devices included in computing environment 500. For example, enterprise network 560 may interconnect enterprise application management server 510, client devices 520-530, and public network 570, which may in turn, interconnect client device 540.

Client devices 520-540 may include a primary application, a secondary application and a monitoring service, and the monitoring service such as monitoring service 540 may monitor the operation state of primary application 542 and secondary application 544 on client device 520. For example, a VPN application may be the primary application and a token application may be a secondary application. Upon a user clicks a token input field in the VPN application, the monitoring service may detect this triggering event and send this triggering event to enterprise application management server 510.

Figure 6A:
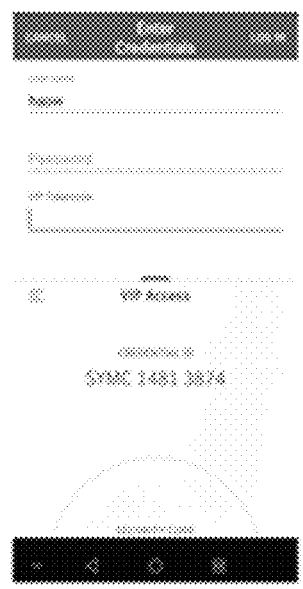
FIG. 6A depicts example primary and secondary applications displayed on a screen of a mobile computing device.

FIG. 6A depicts an example primary and secondary applications displayed on a screen of a mobile computing device. The primary or main application is a VPN application entitled "Citrix VPN" and the secondary application is a token application entitled "VIP access." The primary application "Citrix VPN" may contain a trigger "VIP tokencode" field. As the primary application "Citrix VPN" may be invoked on a user device, the user may enter the user name and password credentials to login to the primary application. As the user clicks the input field of "VIP tokencode," the monitoring service may detect a triggering event and send this triggering event to enterprise application management server 510. For example, the triggering event may be a message including a network address of the user device, the primary application "Citrix VPN" being invoked on the user device, a view on Citrix VPN application and the credentials the user has entered in the primary application. Based on the message, enterprise application management server 510 may dynamically determine the collaborative relationship between the primary and a secondary application. Determining the collaborative relationship between the applications may include determining whether to enable multiple application support for the primary application, which policy to apply if multiple application support is enabled, and which secondary application to invoke on the user device, and the size and portion of the screen that the secondary application may occupy on the user device. After the triggering event may be invoked, enterprise application management server 510 may automatically cause the secondary application "VIP access" to be displayed on a portion of the same screen that also displays the primary application "Citrix VPN." Based on the user credentials entered in the primary application, a credential ID may be generated and displayed in the secondary application "VIP access". Enterprise application management server 510 may pass the credential ID to the primary application, without the need of user operations. Given that the user may not need to toggle through the primary and secondary applications and copy/paste the credential ID back to the primary applications for further authentication, such collaborative relationship may reduce overhead in operations and enhance user experience.

Figure 6B:
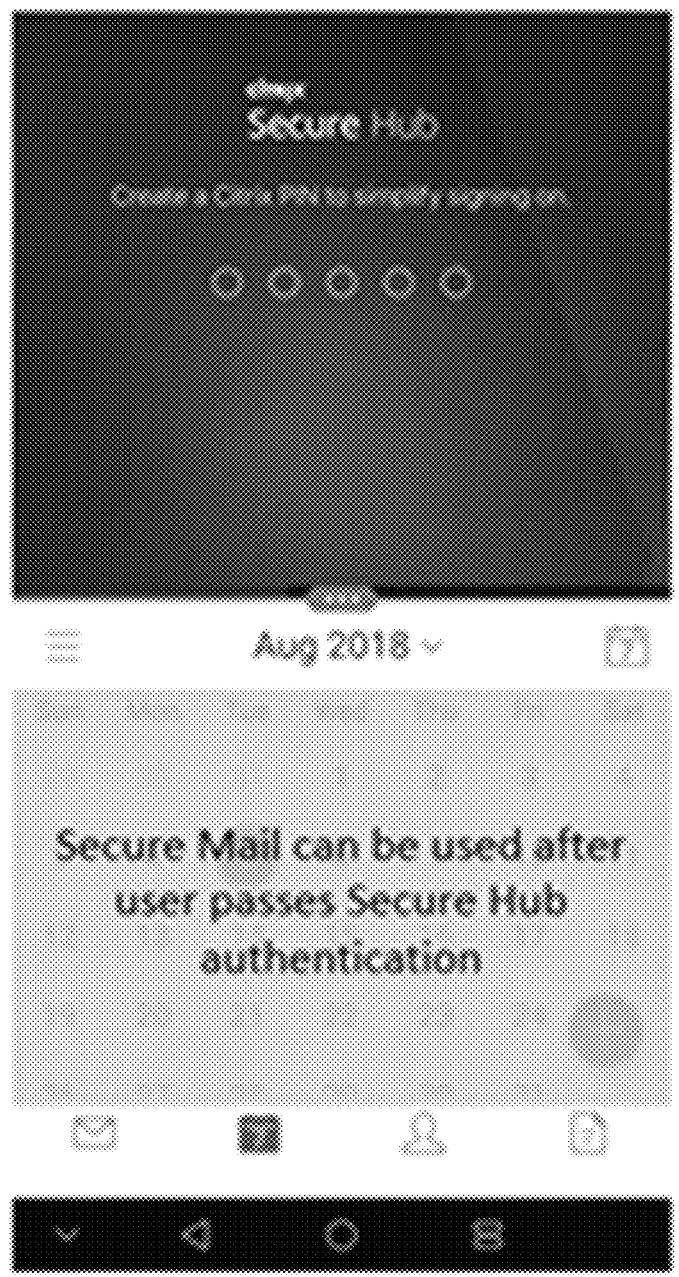
FIG. 6B depicts another example primary and secondary applications on a screen of a mobile computing device.

Referring back to FIG. 5, enterprise application management server 510 may receive the triggering event from the monitoring service 546 and determine whether to enable multiple application support and the policy associated with the primary and secondary applications. In some examples, based on the location of the user device 520 executing primary application 542, enterprise application management server 510 may determine that the multiple application support policy is appropriate for the primary application. For example, if enterprise application management server 510 determines that the user device (such as user device 540) resides in public network 570, multiple application support may be enabled and a multiple application support policy indicating the collaborative relationship between the VPN primary application and the token secondary application may apply. If enterprise application management server 510 determines that the user device (such as user device 520) resides in enterprise network, a multiple application support policy indicating the collaborative relationship between the VPN primary application and the token secondary application may not apply; however, a multiple application support policy indicating the collaborative relationship between a SecureMail primary application and a SecureHub secondary application (as illustrated in FIG. 6B below) may apply.

In some examples, based on the type of the user device 520 executing primary application 542, enterprise application management server 510 may determine that whether the multiple application support policy is appropriate for the primary application. For example, if enterprise application management server 510 determines that the user device (such as user device 520) is a device managed by management server such as management server 410, and the user device may be allowed to access enterprise resources, multiple application support may be enabled and a multiple application support policy indicating the collaborative relationship between the VPN primary application and the token secondary application may apply.

In some examples, based on the user input in the primary application, enterprise application management server 510 may determine whether the multiple application support policy is appropriate for the user. FIG. 6B depicts another example primary and secondary applications displayed on a screen of a mobile computing device. The primary or main application may be the "SecureHub" application and the secondary application may be a "SecureMail" application or a "SecureWeb" application. The primary application "SecureHub" may contain a trigger "Citrix Pin" field. As the primary application "SecureHub" may be invoked on a user device, the user may enter the pin to login to the primary application. The monitoring service may detect this triggering event and send this triggering event to enterprise application management server 510. Upon a successful login to the primary application "SecureHub", enterprise application management server 510 may determine one or more secondary applications that the user may access based on the role or privilege of the user, and the policy to be applied to the primary application. For example, enterprise application management server 510 may determine that the enterprise user may access a SecureMail or a SecureWeb application. As illustrated in FIG. 6B, the corresponding SecureMail or SecureWeb application may be displayed on the same screen with the SecureHub application. The SecureHub may be launched as a split application in the same screen as the SecureMail or SecureWeb application and subsequently be minimized after user enters the correct pin code. As such, the collaborative relationship between the applications may provide a consistent experience for the users who have the privileges to access the primary and secondary applications.

Figure 7A:
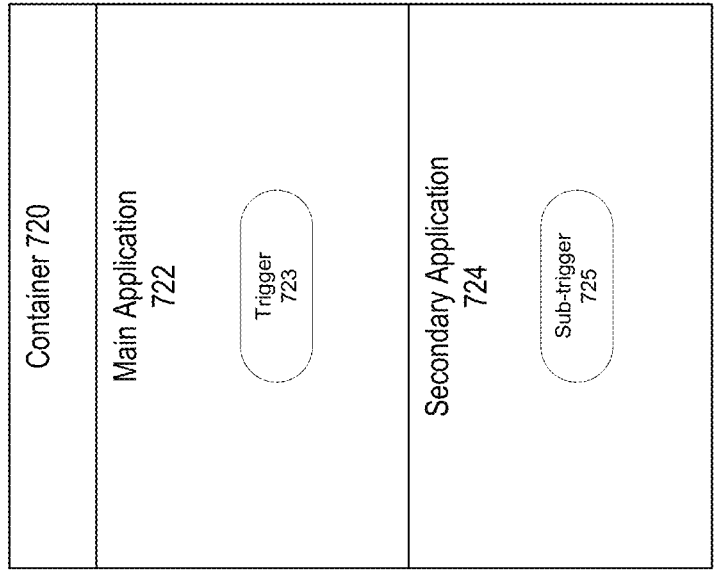
FIG. 7A depicts an illustrative scenario based display of multiple applications on a screen of a mobile computing device.
Figure 7A:
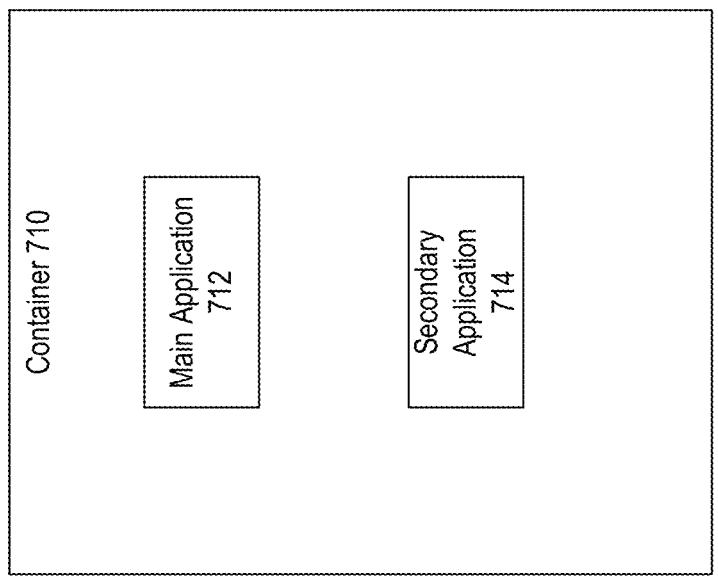

FIG. 7A depicts an illustrative scenario based display of multiple applications on a screen of a mobile computing device. FIG. 7A illustrates the state of primary application 712 and secondary application 714 in container 710, before they may be launched or invoked on the screen of the user device. The presentation or display of primary application 712 and secondary application 714 may be collaborated with each other, where each application may be maximized to take up an entire screen, or be minimized to run in the background.

A container may be an environment where the primary and secondary applications run and the containers may be a user device or a browser application on the user device. The container may read policy associated with the primary and secondary applications and check whether the multiple applications on-screen scenario is allowed. The container may also interact with enterprise application management server 510, where enterprise application management server 510 may determine whether the multiple applications on-screen scenario may be allowed based on the policy associated with the primary and secondary applications.

A monitoring service may be running in the container to launch applications, detect on-screen events and the operation state of the applications. The monitoring service may be a build-in function of the container or a stand-alone service running on the user device.

FIG. 7A illustrates the state of primary application 722 and secondary application 724 in container 720, after they are launched or invoked on the screen of the user device, where primary application 722 and secondary application 724 each occupies a portion of the screen. Primary application 722 may contain trigger 723, which may be an element in primary application that may launch or close secondary application 724. Primary application 722 may contain multiple triggers which may link to a same secondary application or different secondary applications. Secondary application 724 may contain sub trigger 725, which may change the status of secondary application 724 by minimizing or maximizing it.

Figure 7B:
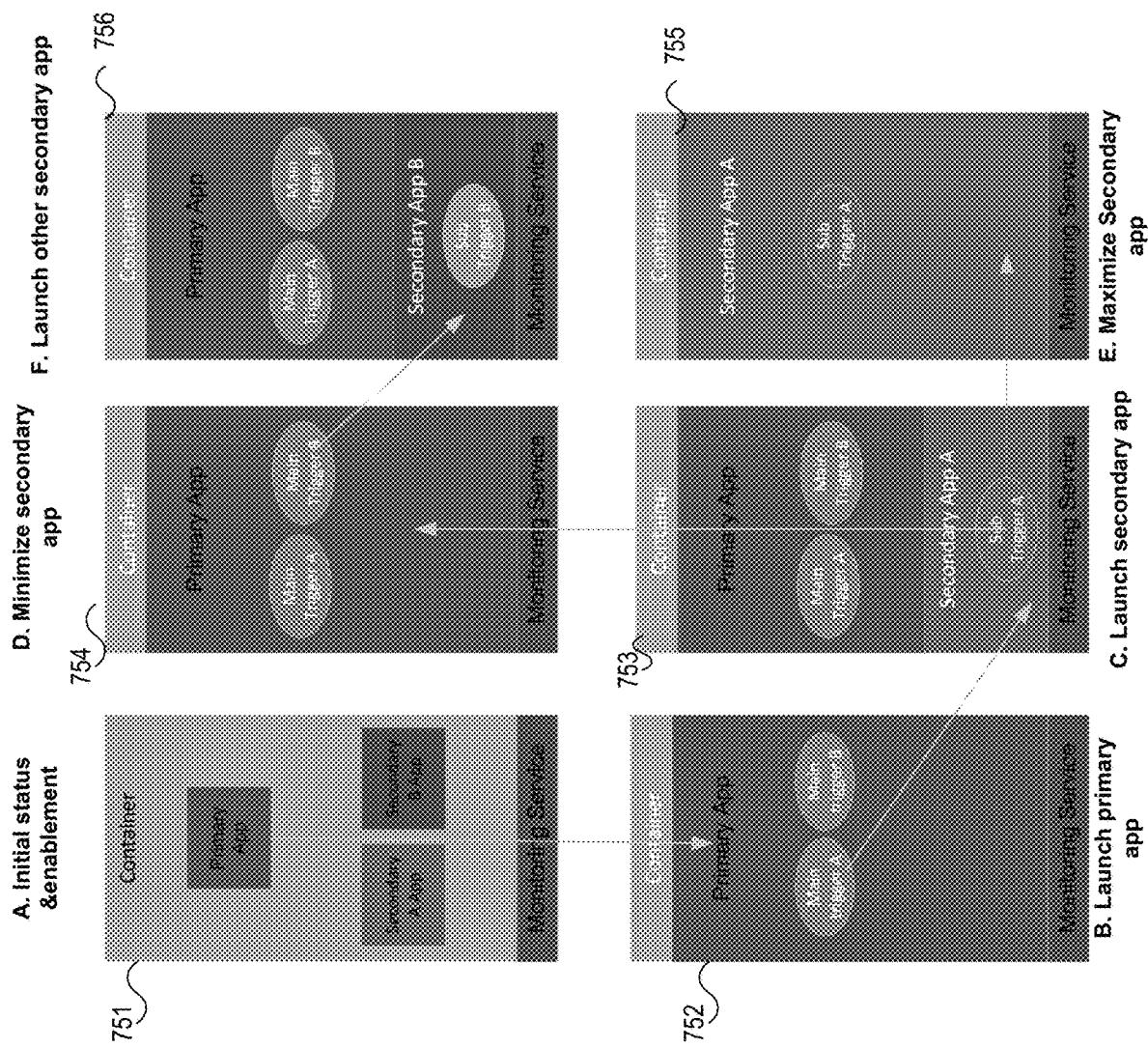
FIG. 7B depicts operations on scenario based display of multiple applications on a screen of a mobile computing device.
Figure 8B:
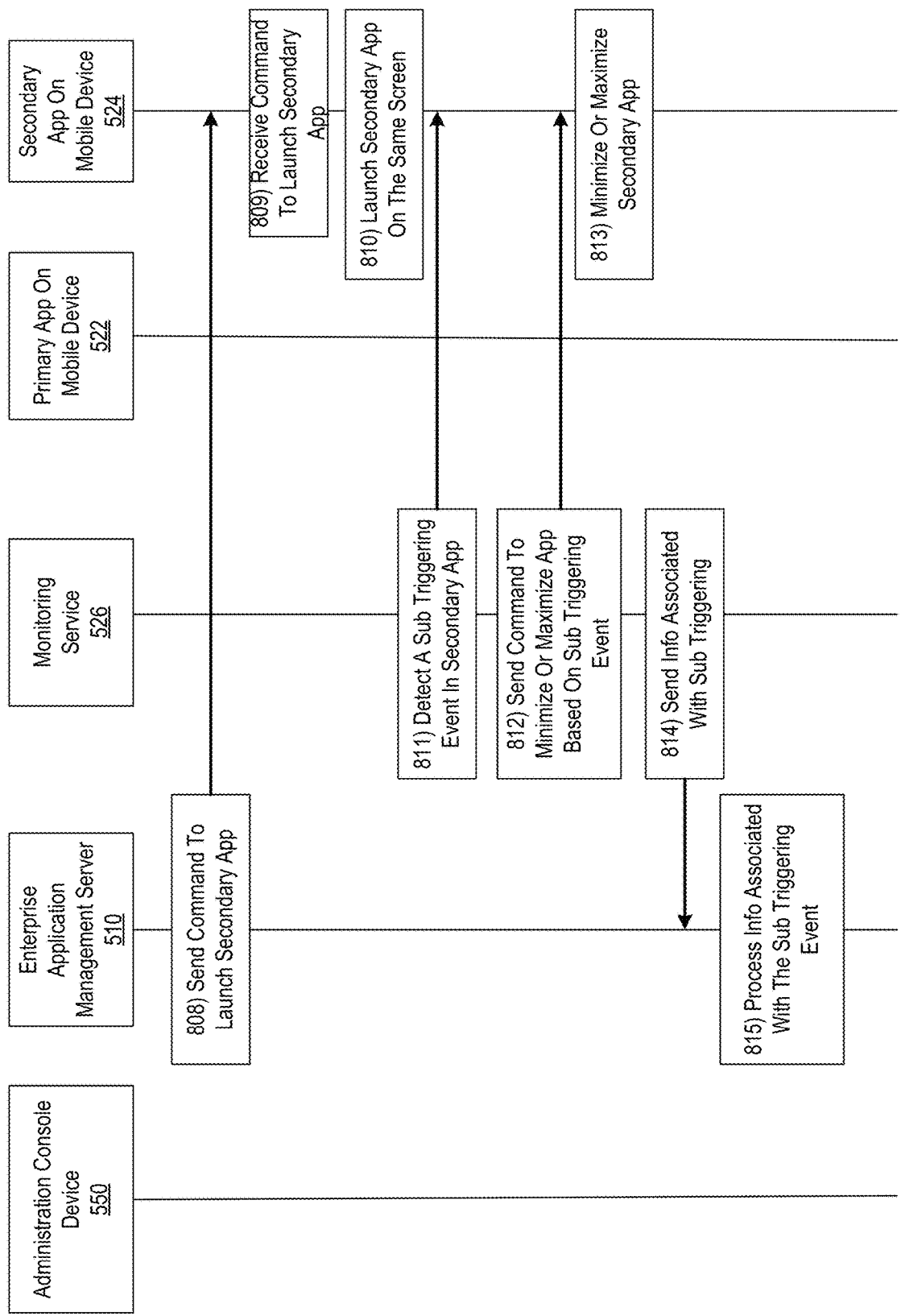

FIG. 7B depicts operation states of scenario based display of multiple applications on a screen of a mobile computing device. In the initial state 751, there may be a primary application, and two secondary applications A and B in the container. There may also a monitoring service or backend service to monitor the operational state of the applications. The primary application may be invoked or launched on the screen of the mobile device to arrive at state 752. In this state, the primary application may occupy the screen of the mobile device and it may contain two triggers A and B. An event may hit trigger A and launch secondary application A in state 753, where the primary and secondary application A may share the same screen of the mobile device. The primary application may contain triggers A and B, and the secondary application A may contain sub trigger A.

Sub trigger A may be hit to arrive at state 754, where the secondary application A may be minimized and the primary application with triggers A and B may take over the screen of the mobile device. Alternatively, in state 753, sub trigger A in secondary application A may be hit to maximize secondary application A to generate state 755, where secondary application A may take up the screen of the mobile device.

Following state 754, trigger B in the primary application may be hit to launch secondary application B on the screen at state 755. In this state, the primary application (with triggers A and B) and secondary application B may be displayed simultaneously on the screen. Secondary application B may contain sub trigger B.

FIGS. 8A-8D depict an example event sequence for scenario based multiple application display on-screen in accordance with one or more illustrative aspects described herein. The communications between components of FIGS. 8A-8D may be encrypted via Transport Layer Security (TLS) cryptographic protocols or Internet Protocol Security (IPsec) tunnels that provide communications security over a computer network.

Referring to FIG. 8A, at step 801, an enterprise administrator may use an administrator console device to access the enterprise application management server and configure the collaborative relationship between a primary application and one or more secondary applications. For example, enterprise application management server 510 may modify the primary and secondary applications to enable multiple application support. The modification process may be performed as a source code change before build or a wrap process after build. In some examples, the modification may include, adding a trigger to the primary application so that when a trigger in the primary application is hit, a specified view on the corresponding secondary application may be launched or closed. A trigger, may include, for example, a UI element (such as a button, or a textbox), or a coordinate on the screen. The modification may also include adding a sub trigger to the secondary application so that when the sub trigger in the secondary application is hit, the secondary application may be minimized or maximized in the whole screen. The sub-trigger in the secondary application may have similar data element as that of the trigger in the primary application.

To enable multiple application support, the monitoring service may also be modified. The monitoring service may be a service that may monitor the systems, applications and functions running in the backend. A trigger may be added to the monitoring service, so that when the monitoring service observers that a trigger is hit in the primary application, it may load a specified view on the secondary application. After application collaboration has been enabled, the primary and secondary applications may be installed in the container.

The enterprise administrator may configure the collaboration relationship using the sample policies in table 1.1 below. Enterprise application management server 510 may check these policies to determine the relationship between the primary application and the corresponding one or more secondary applications.

| Primary App identifier | Primary View identifier | Secondary App identifier | Secondary View identifier | Action | Comment |
|---|---|---|---|---|---|
| com.abc | Id = 001 | com.xyz | Id = 002 | Prohibited | The id 001 view on app com.abc does not allow on the same screen with view id 002 on app com.xyx |
| com.abc | Id = 002 | * | * | Prohibited | The id 002 view on app com.abc will not allow multiple screen in any circumstances |
| com.abc | Id = 003 | com.def | Id = 004 | Allowed | The id 003 view on app com.abc allows on the same screen with view id 004 on app com.def |

According to table 1.1, while the id 001 view on application com.abc may not allow on the same screen with view id 002 on app com.xyx; and the id 002 view on app com.abc may not allow multiple screen in any circumstances, the id 003 view on app com.abc may be allowed on the same screen with view id 004 on app com.def. As such, for the primary application com.abc with view Id=003, enterprise application management server 510 may establish collaborative relationship with the corresponding secondary application com.def with view Id=004. Policies may also be used by the container to allow/block multiple application support in screen actions.

At step 802, the monitoring service may receive a request to launch a primary application on the screen of the mobile device. For example, monitoring service 526 may receive a request from an enterprise user from client device 520 to launch primary application 522 on a screen of client device 520. In the example of FIG. 6A, the monitoring service may receive a request from the user to launch the primary application Citrix VPN.

At step 803, the monitoring service may send a command to launch the primary application on the mobile device. In some examples, monitoring service 526 may send a command to launch primary application 522 and display the application on the screen of the client device 520. In the example of FIG. 6A, the monitoring service may launch a view of the primary application Citrix VPN.

At step 804, the monitoring service may detect a triggering event in the primary application and at step 805, the monitoring service may send the information associated with the triggering event to the enterprise application management server. For example, monitoring service 526 may detect that a button, a text field or a coordinate is hit by a user in primary application 522 and the monitoring service 526 may send the information associated with the triggering event to enterprise application management server 510. The information may include an identifier of the primary application, an identifier of a view in the primary application, and user input data generated in the primary application. In the example of FIG. 6A, the monitoring service may detect that a user has entered the credentials such as user name and password, and hit the "VIP tokencode" input field in the primary application Citrix VPN. The monitoring service may send information including an identifier of the primary application Citric VPN, an identifier of the view in the Citrix VPN and the user name/password that user has entered in the Citrix VPN application.

At step 806, the enterprise application management server may receive info associated with triggering event and at step 807, the enterprise application management server may determine a secondary application corresponding to the primary app based on the policy. For example, enterprise application management server 510 may receive the information associated with the triggering event and determine a particular secondary application 524 corresponding to primary application 522 based on policy. In the example of FIG. 6A, enterprise application management server 510 may receive the identifiers of the primary application Citrix VPN and the view in the Citrix VPN, and determine whether multiple application support may be allowed on the view of the Citrix VPN application based on the policy configured at step 801. If multiple application support is allowed, enterprise application management server 510 may further determine the identifiers of the secondary application and the view based on the policy. In the example of FIG. 6A, enterprise application management server 510 may determine that a view on secondary application VIP access may be allowed on the same screen with primary application Citrix VPN. Enterprise application management server 510 may also process the user credentials received from the monitoring service and determine that secondary application VIP access is allowed on the same screen with primary application Citrix VPN for the user.

At step 808, enterprise application management server may send a command to launch the secondary application. For example, enterprise application management server 510 may send a command to monitoring service 526 to launch secondary application 524 or enterprise application management server 510 may send a command to secondary application 524 to launch the application. In the example of FIG. 6A, enterprise application management server 510 may send a command to launch a view of token application VIP access.

At step 809, the monitoring service or the secondary application may receive the command to launch a view of the secondary application and at step 810 the secondary application may be launched. For example, monitoring service 526 or secondary application 524 may launch secondary application 524. In the example of FIG. 6A, monitoring service 526 may launch a view of secondary application VIP access and transmit user input data such as user name/password to the VIP access application.

At step 811, the monitoring service may detect a sub triggering event in the secondary application. For example, monitoring service 526 may detect that a user has hit a button, a text field, or a coordinate to generate a sub triggering event in the secondary application. In the example of FIG. 6A, monitoring service 526 may detect that the user may hit an icon on the bottom banner of the VIP access token application.

At step 812, the monitoring service may send a command to minimize or maximize the secondary application based on the sub triggering event and at step 813, the secondary application may be minimized or maximized. For example, monitoring service 526 may send a command to minimize or maximize the VIP access application in FIG. 6A, after the user may hit an icon in the bottom banner of the VIP access application.

At step 814, the monitoring service may send information associated with the sub triggering event to the enterprise application management server. For example, monitoring service 526 may send the information including an identifier of the secondary application, an identifier of a view in the secondary application, and user input data generated in the secondary application to enterprise application management server 510. In some examples, the information may also include identifies of the primary application and a view on the primary application. In the example of FIG. 6A, monitoring service 526 may send the identifiers of the applications and views on Citrix VPN, VIP access, and the user input data in the VIP access token application.

At step 815, the enterprise application management server may process the information associated with the sub triggering event and at step 816, the enterprise application management server may determine a tertiary application corresponding to the secondary application. For example, enterprise application management server 510 may process the identifiers and user input data collected from the secondary application 524 and determine whether a tertiary application may be allowed to be displayed on the same screen with the secondary application 524 based on the policy related to the secondary application. In some examples, enterprise application management server 510 may also determine whether the tertiary application may be allowed to be displayed on the same screen with the secondary application 524 or the primary application 522. In the example of FIG. 6A, enterprise application management server 510 may determine whether a tertiary application may be allowed to be displayed on the same screen with the secondary application VIP access or the primary application Citrix VPN.

At step 817, the enterprise application management server may send a command to launch the tertiary app in the same screen with the secondary application. For example, enterprise application management server 510 may send a command to the monitoring service 526 to launch the tertiary application in the same screen with secondary application 524. In the example of FIG. 6A, enterprise application management server 510 may send a command to launch a view of a tertiary application such as a Secure Web application on the same screen with the secondary application VIP access, or with both the primary application Citrix VPN and the VIP access application.

Figure 9:
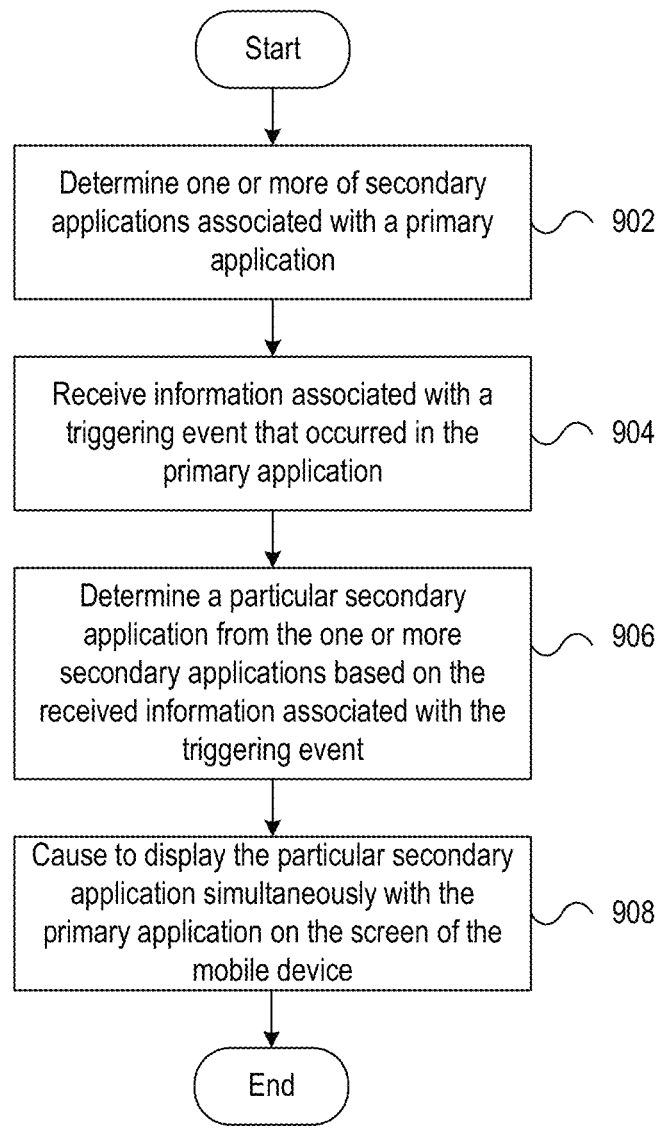
FIG. 9 depicts an example method of for scenario based display of multiple applications on-screen in accordance with one or more illustrative aspects described herein.

FIG. 9 depicts an example method of for scenario based display of multiple applications on-screen in accordance with one or more illustrative aspects described herein. Referring to FIG. 9, at step 902, an enterprise application management server (e.g. enterprise application management server 510) having at least one processor, a communication interface, and memory, may determine one or more of secondary applications associated with a primary application. At step 904, the enterprise application management server may receive, via the communication interface, information associated with a triggering event that occurred in the primary application. The information may identify the primary application and a view on the primary application.

At step 806, the enterprise application management server may determine a particular secondary application from the one or more secondary applications based on the received information associated with the triggering event. Accordingly, at step 808, the enterprise application management server may cause to display, via the communication interface, the particular secondary application simultaneously with the primary application on the screen of the mobile device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. An enterprise application management server comprising:
    at least one processor;
    a communication interface;
    memory storing instructions that, when executed by the at least one processor, cause the server to:
        modify a primary application to enable multiple application support for the primary application on a screen of a mobile device;
        determine one or more secondary applications associated with the primary application based on a policy indicating whether the primary application and the one or more secondary applications are permitted to be displayed simultaneously on the screen of the mobile device;
        receive, via the communication interface and from a monitoring service executed on the mobile device, information associated with a triggering event that the monitoring service detected in the primary application on the mobile device, wherein the triggering event is associated with the primary application, where a User Interface (UI) element located in the primary application is triggered responsive to a user interaction with the UI element;
        after receiving the information associated with the triggering event, receive, via the communication interface and from the monitoring service, a user input associated with the user interaction with the UI element;
        determine a particular secondary application from the one or more secondary applications based on the received information associated with the triggering event and user input; and
        cause to display, via the communication interface, the particular secondary application simultaneously with the primary application on the screen of the mobile device.

2. The enterprise application management server of claim 1, wherein the memory stores additional instructions that, when executed by the at least one processor, cause the server to:
    prior to determining the one or more secondary applications, provision the mobile device to be managed by the enterprise application management server to access one or more enterprise resources.

3. The enterprise application management server of claim 1, wherein the memory stores additional instructions that, when executed by the at least one processor, cause the server to:
    receive, via the communication interface, information associated with a sub-triggering event that occurred in the particular secondary application;
    determine a tertiary application corresponding to the particular secondary application based on the received information associated with the sub-triggering event; and
    cause to display, via the communication interface, the tertiary application simultaneously with the particular secondary application on the screen of the mobile device.

4. The enterprise application management server of claim 1, wherein the memory stores additional instructions that, when executed by the at least one processor, cause the server to:
    receive, via the communication interface, information associated with a sub-triggering event that occurred in the particular secondary application; and
    in response to receiving the information associated with the sub-triggering event, cause to maximize the particular secondary application in the screen of the mobile device.

5. The enterprise application management server of claim 1, wherein the memory stores additional instructions that, when executed by the at least one processor, cause the server to:
    receive, via the communication interface, information associated with a sub-triggering event that occurred in the particular secondary application; and
    in response to receiving the information associated with the sub-triggering event, cause to minimize the particular secondary application in the screen of the mobile device.

6. The enterprise application management server of claim 5, wherein the memory stores additional instructions that, when executed by the at least one processor, cause the server to:
    cause to execute the particular secondary application in a background of the mobile device.

7. The enterprise application management server of claim 1, wherein the memory stores additional instructions that, when executed by the at least one processor, cause the server to:
automatically capture a collaboration relationship between the primary application and the one or more secondary applications.

8. The enterprise application management server of claim 1, wherein the memory stores additional instructions that, when executed by the at least one processor, cause the server to:
in response to cause to display the particular secondary application simultaneously with the primary application, receive, via the communication interface, user input data from the particular secondary application; and
send, via the communication interface, the user input data to the primary application.

9. A method comprising:
at an enterprise application management server comprising at least one processor, memory, and a communication interface:
modifying a primary application to enable multiple application support for the primary application on a screen of a mobile device;
determining one or more secondary applications associated with the primary application based on a policy indicating whether the primary application and the one or more secondary applications are permitted to be displayed simultaneously on the screen of the mobile device;
receiving, via the communication interface and from a monitoring service executed on the mobile device, information associated with a triggering event that the monitoring service detected in the primary application on the mobile device, wherein the triggering event is associated with the primary application, where User Interface (UI) element located in the primary application is triggered responsive to a user interaction with the UI element;
after receiving the information associated with the triggering event, receiving, via the communication interface and from the monitoring service, a user input associated with the user interaction with the UI element;
determining a particular secondary application from the one or more secondary applications based on the received information associated with the triggering event and the user input; and
causing to display, via the communication interface, the particular secondary application simultaneously with the primary application on the screen of the mobile device.

10. The method of claim 9, wherein the user interaction comprises a user clicking on an input field in the primary application, and wherein the user input comprises user entering one or more inputs in the input field in the primary application.

11. The method of claim 9, further comprising:
prior to determining the one or more secondary applications, provisioning the mobile device to be managed by the enterprise application management server to access one or more enterprise resources.

12. The method of claim 9, further comprising:
receiving, via the communication interface, information associated with a sub-triggering event that occurred in the particular secondary application;
determining a tertiary application corresponding to the particular secondary application based on the received information associated with the sub-triggering event; and
causing to display, via the communication interface, the tertiary application simultaneously with the primary application and the particular secondary application on the screen of the mobile device.

13. The method of claim 9, further comprising:
receiving, via the communication interface, information associated with a sub-triggering event that occurred in the particular secondary application; and
causing to maximize the particular secondary application in the screen of the mobile device.

14. The method of claim 9, further comprising:
receiving, via the communication interface, information associated with a sub-triggering event that occurred in the particular secondary application; and
causing to minimize the particular secondary application in the screen of the mobile device.

15. The method of claim 9, further comprising:
automatically capturing a collaboration relationship between the primary application and the one or more secondary applications.

16. The method of claim 9, further comprising:
in response to causing to display the particular secondary application simultaneously with the primary application, receiving, via the communication interface, user input data from the particular secondary application; and
sending, via the communication interface, the user input data to the primary application.

17. One or more non-transitory computer-readable media storing instructions that, when executed by a computing platform comprising at least one processor, memory, and a communication interface, cause the computing platform to:
modify a primary application to enable multiple application support for the primary application on a screen of a mobile device;
determine one or more secondary applications associated with the primary application based on a policy indicating whether the primary application and the one or more secondary applications are permitted to be displayed simultaneously on the screen of the mobile device;
receive, via the communication interface and from a monitoring service executed on the mobile device, information associated with a triggering event the monitoring service detected in the primary application on the mobile device, wherein the triggering event is associated with the primary application, where a User Interface (UI) element located in the primary application is triggered responsive to a user interaction with the UI element;
after receiving the information associated with the triggering event, receive, via the communication interface and from the monitoring service, a user input associated with the user interaction with the UI element;
determine a particular secondary application from the one or more secondary applications based on the received information associated with the triggering event and the user input; and
cause to display, via the communication interface, the particular secondary application simultaneously with the primary application on the screen of the mobile device.

* * * * *